United States Patent
Krupick et al.

[15] 3,661,375
[45] May 9, 1972

[54] SHOCK AND VIBRATION ISOLATOR AND DAMPING SYSTEM

[72] Inventors: Walter J. Krupick, Succasunna; Allan B. Pilger, W. Caldwell; Robert J. Dickie, Maywood, all of N.J.

[73] Assignee: The Singer Company, New York, N.Y.

[22] Filed: May 7, 1970

[21] Appl. No.: 35,318

[52] U.S. Cl. ....................................................267/137
[51] Int. Cl. ....................................................F16f 15/10
[58] Field of Search..................267/113, 114, 161, 137, 182; 64/26

[56] References Cited
UNITED STATES PATENTS

| 3,091,103 | 5/1963 | Goodwin | 267/113 |
| 166,592 | 8/1875 | Puvall | 267/161 |

Primary Examiner—James B. Marbert
Attorney—S. A. Giarratana and S. Michael Bender

[57] ABSTRACT

A system for connecting between two members to provide isolation and damping of relative movement between the members, the system including a pair of spaced telescoped coupling sleeves respectively secured to said members. A damping means is disposed in the space between the sleeves, and an effective spring resistance to radial and axial movement is provided between the sleeves.

17 Claims, 8 Drawing Figures

INVENTORS
WALTER J. KRUPICK
ALLAN B. PILGER
BY ROBERT J. DICKIE

ATTORNEY

INVENTORS
WALTER J. KRUPICK
ALLAN B. PILGER
ROBERT J. DICKIE
BY
ATTORNEY

INVENTORS
WALTER J. KRUPIK
ALLAN B. PILGER
BY ROBERT J. DICKIE

ATTORNEY

INVENTORS
WALTER J. KRUPICK
ALLAN B. PILGER
ROBERT J. DICKIE

BY

ATTORNEY

3,661,375

SHOCK AND VIBRATION ISOLATOR AND DAMPING SYSTEM

BACKGROUND OF THE INVENTION

This invention relates to an isolator and damping system and, more particularly, to a system which provides both isolation and damping of relative movement between two members.

The need for providing for both isolation and damping between two members is well known. For example, in various types of high precision rotating mechanisms, isolation and damping must be provided between a drive shaft and its driven shaft. In the use of a free rotor gyroscope, for example, it has been proposed to mount an isolating mechanism external to the gyro, such as by isolating the platform on which the gyro is mounted. However, with this arrangement, a relatively high level of vibration may be impressed upon the gyro due to resonances of the structure between the gyro and the isolator.

SUMMARY OF THE INVENTION

It is therefore an object of the present invention to provide a shock and vibration isolator and damping system for mounting between two members, which enables the members to operate at high vibration and shock environments, with less degradation of performance and longer life.

In order to fulfill the above objects the system of the present invention comprises an isolator and damping system for connecting between two members, said system comprising a pair of spaced, telescoped coupling sleeves respectively secured to said members, damping means disposed in the space between said sleeves, and means to provide an effective spring resistance to relative radial and axial movements between said sleeves.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
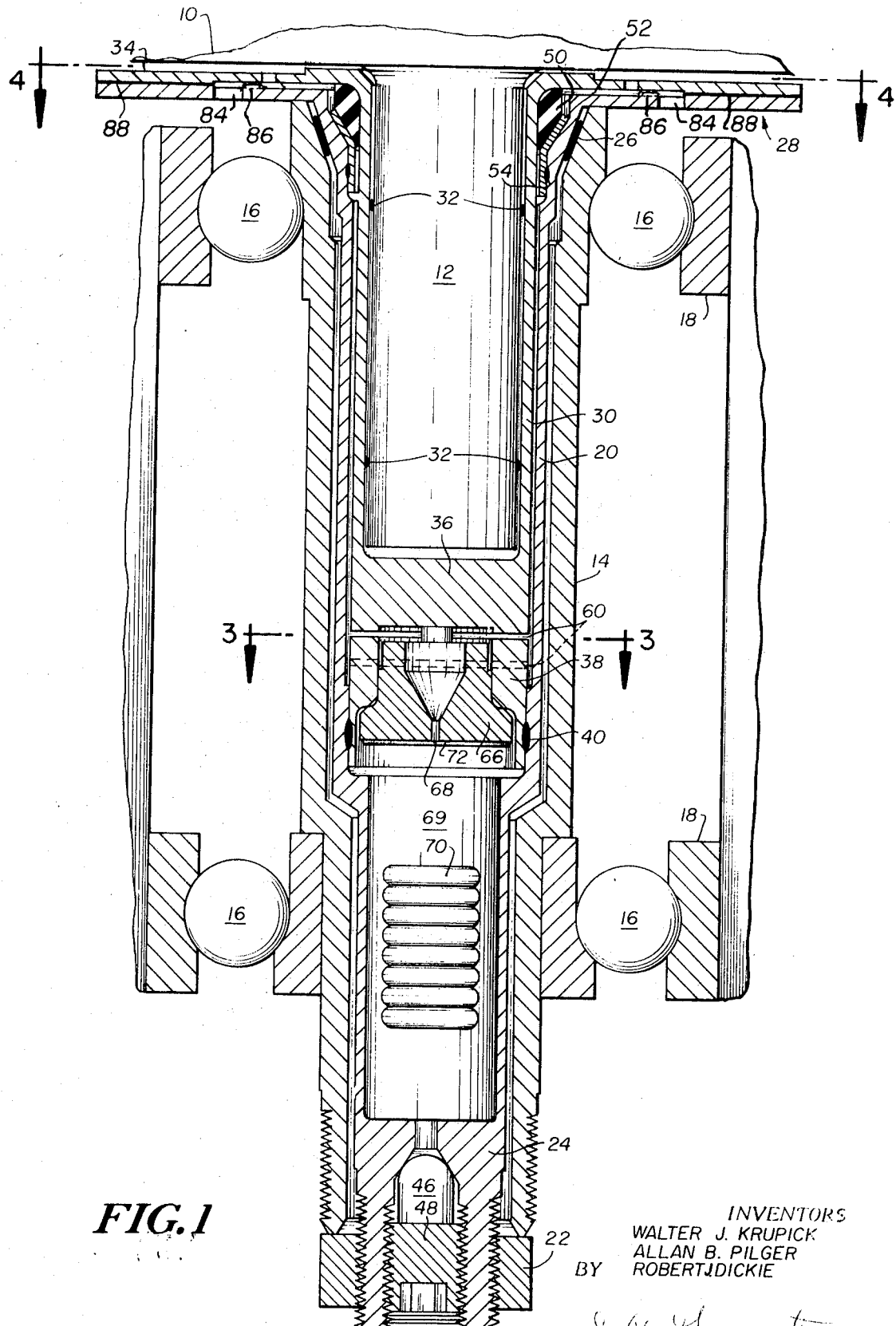
FIG. 1 is a vertical cross-sectional view of the system of the present invention.

Referring specifically to FIG. 1 of the drawings, it will be assumed that the system of the present invention is used in connection with a free rotor gyro having a flex assembly shown partially by the reference numeral 10 and adapted to carry a rotor (not shown) in a known manner. The flex assembly has a shaft 12 which is driven by a drive shaft 14 operatively connected to the shaft 12 through the isolator and damping system of the present invention. The drive shaft is, in turn, driven by a high speed motor (not shown) supported on bearings 16 and race members 18, in a known manner.

According to the system of the present invention an outer sleeve 20 is mounted within and spaced from the inner wall of the drive shaft 14 and is attached to same by means of a nut 22 engaging the drive shaft and threadably mounted on the lower end 24 of the sleeve 20, as viewed in FIG. 1. Further, the sleeve 20 is cemented to the drive shaft near the upper end thereof along a circular joint 26. A circular flange 28 extends outwardly from the upper end of the cylinder 20, for purposes that will be described in detail later.

An inner sleeve 30 extends within the outer sleeve 20, with the outer wall of the sleeve 30 being spaced slightly from the inner wall of the sleeve 20. A portion of the shaft 12 extends within the inner sleeve 30 and is attached thereto by means of two circular cement joints 32.

A circular flange 34 is formed on the upper end of the inner sleeve 30 and is spaced slightly from the flange 28 of the cylinder 20, as shown in FIG. 1.

The bottom end of the inner sleeve 30 has a solid portion 36 which extends into a cylindrical flex cylinder 38, the outer surface of which is attached to the inner wall of the sleeve 20 by means of a circular weld joint 40.

A damping fluid of any known type is disposed in the cylindrical space between the sleeves 20 and 30, and in the bottom portion of the sleeve 20 immediately below the flex cylinder 38. A bottom seal for the fluid is formed by a nylon plug 46 held in place by a screw 48 extending through the end 24 of the inner sleeve 20, and an upper seal is provided by an elastomer member 50 which is bonded to the inner sleeve 30, and to a cylinder 52 welded to the inner wall of the outer sleeve 20 along a circular joint 54.

Figure 2:
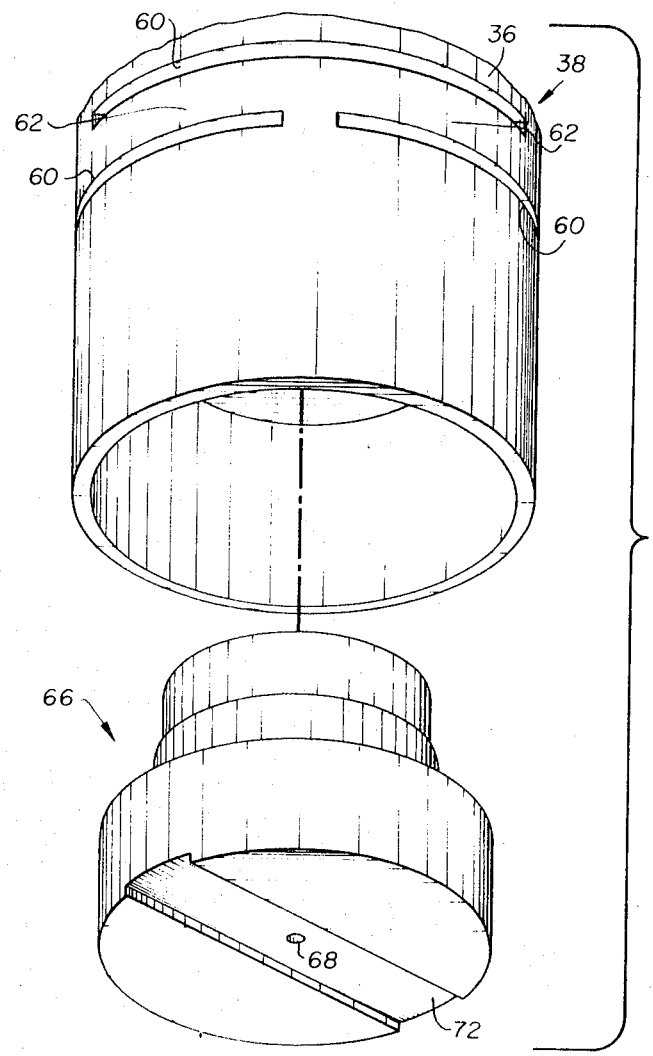
FIG. 2 is an exploded, partial, perspective view of a portion of the system of FIG. 1.
Figure 3:
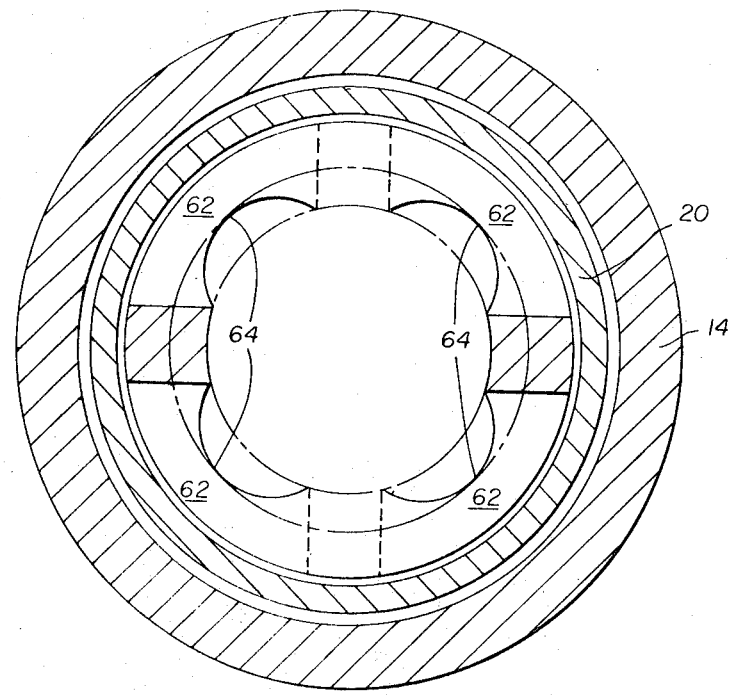
FIGS. 3 and 4 are cross-sectional views taken along the lines 3—3 and 4—4, respectively, of FIG. 1.

The details of the flex cylinder 38 are shown in FIG. 2. Specifically, two spaced pairs of arcuate slots 60 are formed through the wall of the cylinder, the ends of the slots of each pair being spaced apart as shown to form four flex portions 62 which extend at 90° intervals. As shown in FIG. 3, the inner wall of the flex cylinder 38 is bored in four areas as shown by the reference numerals 64 to increase the compliance of the flex portions 62.

Referring again to FIGS. 1 and 2, an axial damping member 66 extends within the flex cylinder 38 and has a tapered cavity formed therein which terminates at an orifice 68. The damping fluid can thus pass from the space between the sleeves 20 and 30, through the slots 60 in the flex cylinder 38, through the tapered cavity in the damping member 66, through the orifice 68, and into a chamber 69 formed within the lower portion of the outer sleeve 20 immediately below the damping member 66.

An enclosed bellows 70 is disposed in the chamber 69, and a flue 72 extends across the bottom of the damping member 66 in communication with the chamber and with the orifice 68.

Figure 4:
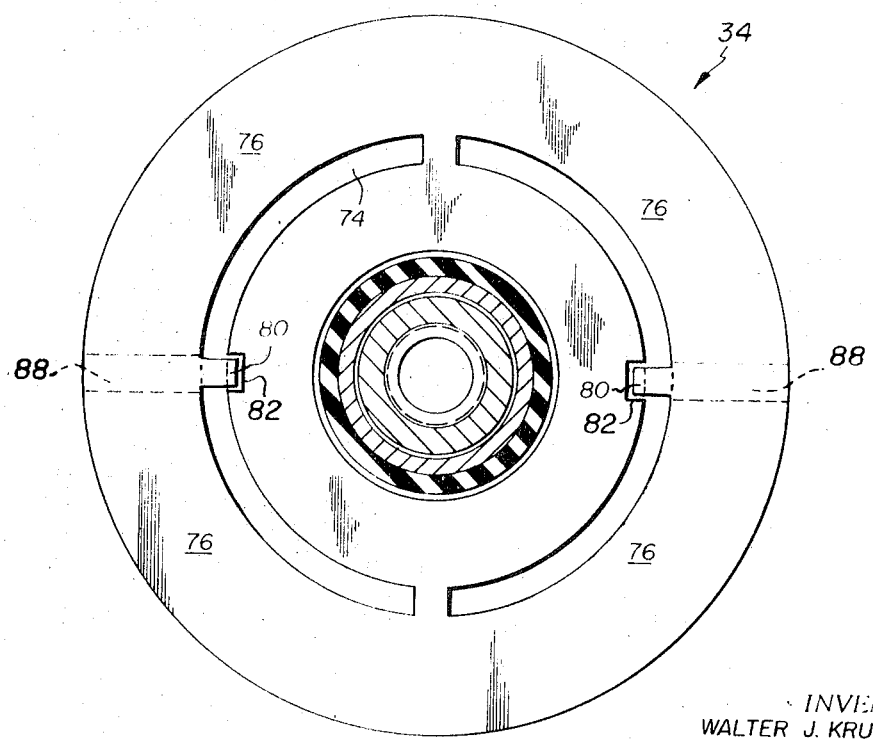

The details of the flange 34 are shown in FIG. 4. In particular, a pair of arcuate slots 74 extend through the flange 34 and are spaced apart at their ends to form two pairs of symmetrical flex portions 76. A pair of diametrically opposed tabs 80 are provided on the flange 34 and extend across the respective arcuate slots of the latter into radially extending notches 82. The flange 28 (not shown in detail) is similar to the flange 34 and includes a pair of arcuate slots 84 (FIG. 1) coextensive with the slots 74 of the flange 34. A pair of raised stop members 86 are formed on the flange 28 and are located immediately below the tabs 80 of the flange 28 to limit the rocking movement between the flanges 28 and 34. The flanges 28 and 34 are welded together along a pair of diametrically opposed linear joints 88, so that the respective sections 76 are axially aligned and form an effective spring resistance.

In operation of the gyro, actuation of the drive shaft 14 causes a corresponding rotation of the flex hinge shaft 12 due to the connections between the shaft 14 and the sleeve 20, between the sleeve 20 and the sleeve 30, and between the sleeve 30 and the shaft 12.

The shaft 12 is isolated from vibrations and shock due to the effective spring resistances provided by the system of the present invention. Specifically, an effective radial spring is formed by the flex portions 76 of the flange 28 and by the identical flex portions of the flange 34, due to their connection via the joints 88. The flex portions of both flanges 28 and 34 act in series and permit a relatively high load carrying capacity for a given spring rate and size.

An effective axial spring is formed by the flex portions 62 of the flex cylinder 38, and as a result, axial movement of the shaft 12 with respect to shaft 14 in either direction will cause a slight axial movement of the inner sleeve 30 with respect to the flex cylinder 38, and therefore the cylinder 20. The effective axial spring permits a low radial compliance, while at the same time achieving a correct axial compliance.

Radial damping is achieved with the above arrangement as a result of fluid being forced to move radially in the space between the sleeves 20 and 30 in response to radial movement of the inner sleeve 30 with respect to the outer sleeve 20, which movement is in the form of a rocking or pivotal movement of the sleeve 30.

Axial movement of the shaft 12, and therefore the inner sleeve 30, with respect to the shaft 14, and therefore the outer sleeve 20, from top to bottom as viewed in FIG. 4, will be damped as a result of fluid being forced from the cavity in the damping member 66 through the orifice 68, and into the chamber 69, thus causing a corresponding rise of pressure in the chamber 69, as well as a compression of the bellows 70. Movement of the shaft 12 and the sleeve 30 in the opposite direction causes the pressure in the latter chamber to decrease, and a corresponding flow of fluid in the opposite direction due to expansion of the bellows 70. In the event the bellows expands to a point whereby it covers the orifice 68, the flue 72 maintains communication between the orifice and the chamber 69. Additional axial damping is achieved by virtue of the fluid within the cylindrical space between the sleeves 20 and 30 being placed in shear as a result of the above axial movements.

The advantages of the isolator and damping system used in the above environment are many. For example, the system is viscous damped and has a low hysteresis and high damping. Also the radial and axial spring designs achieve a large load carrying capacity within a small space. Further, the axial damping is relatively simple while still achieving linear damping due to the fact that the fluid is forced into a relatively constant high static pressure area. Also, the system requires a minimum additional space due to the fact that most of it is disposed within the bearing drive shaft.

Figure 6:
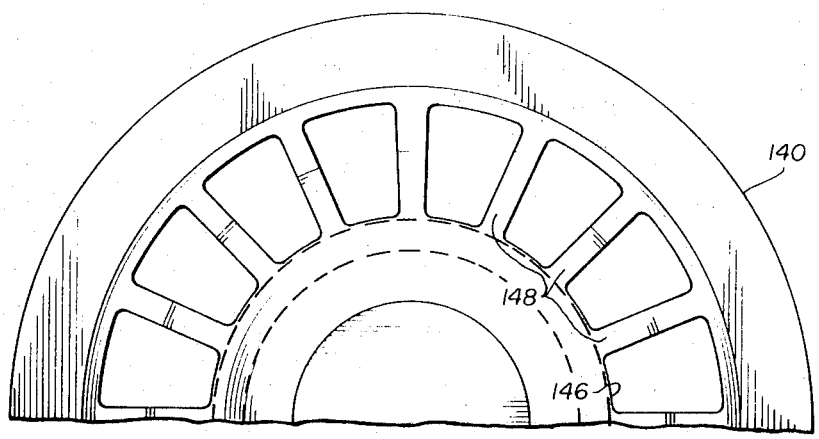
FIG. 6 is a cross-sectional view taken along the line 6—6 of FIG. 5.
Figure 5:
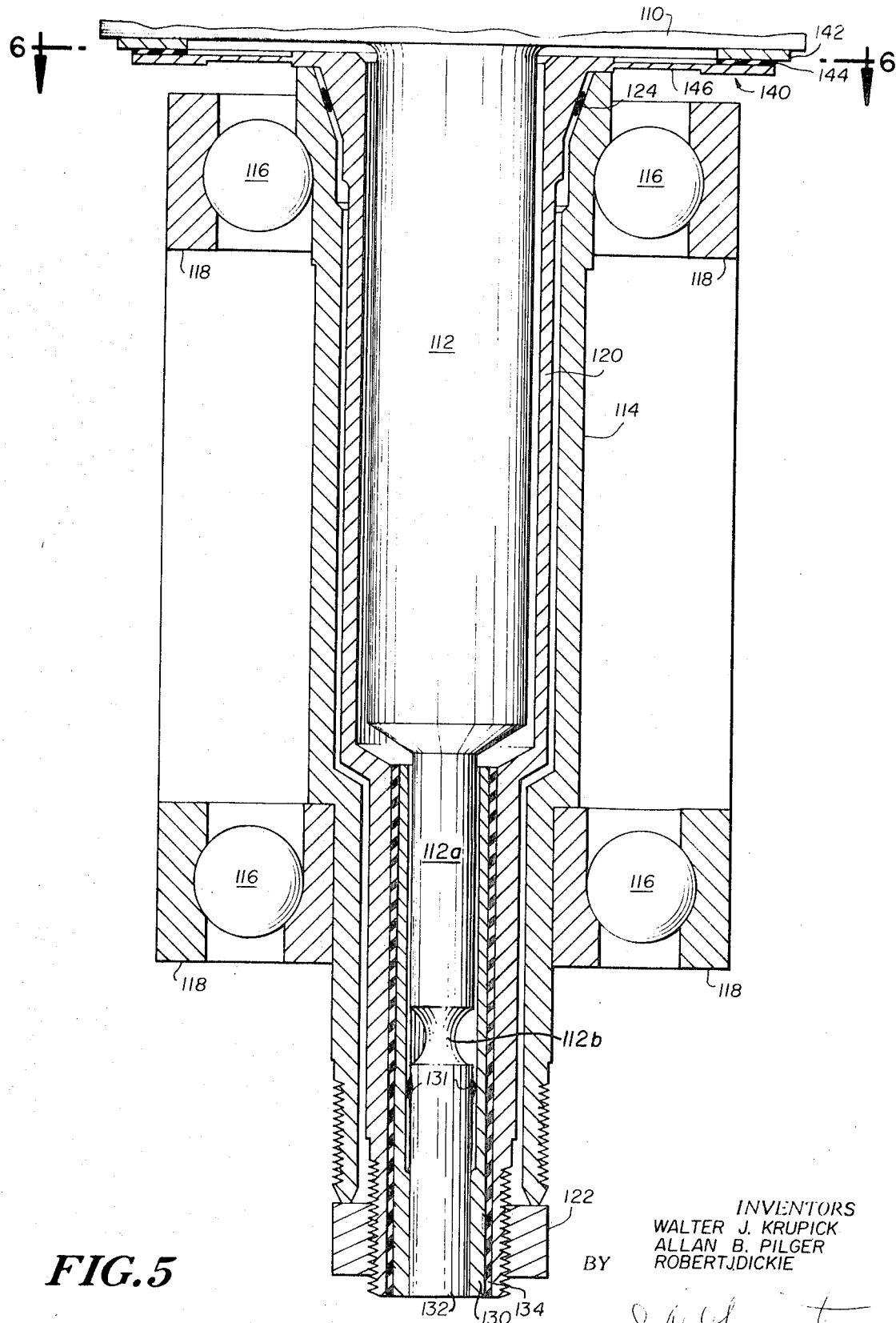
FIG. 5 is a view similar to FIG. 1, but depicting another embodiment of the present invention.

According to the embodiment of FIGS. 5 and 6, a flex assembly, partially shown by the reference numeral 110, is adapted to carry a rotor (not shown) to form a free rotor gyro as in the embodiment of FIGS. 1-4. The flex assembly 110 has a shaft 112 which is of a greater length than the shaft 12 of the previous embodiment with a portion of it being of a reduced diameter as shown by the reference numeral 112a. The shaft 112 may be machined to the form shown or, alternatively, the reduced portion may be a separable extension. A portion of the reduced portion 112a of the shaft may be necked-down as shown by the reference numeral 112b.

Also, as in the previous embodiment, the shaft 112 is driven by a drive shaft 114 operatively connected thereto by means of the isolator and damping system of the present invention, the shaft 114 being driven by a motor (not shown) supported on a plurality of bearings 116 and race members 118.

In accordance with this embodiment, an outer sleeve 120 is provided within the shaft 114 in a spaced relationship thereto, and is fixed thereto by means of a nut 122 engaging the shaft and threadedly engaging the outer surface of the sleeve. A cement joint 124 is also formed between the shaft 114 and the sleeve 120 near their upper ends, as viewed in FIG. 5.

An inner sleeve 130 extends over the reduced portion of the shaft 112, and is cemented with respect thereto along a circular joint 131. The outer wall of the sleeve 130 is spaced from the inner wall of the sleeve 120, and an elastomer cylinder 134 is disposed within this space and is molded to the sleeves 120 and 130, in a known manner.

A circular flange 140 extends outwardly from the upper end of the sleeve 120 and is spaced from a ring 142 fixed with respect to the bottom surface of the flex assembly 110. An elastomer ring 144 is disposed within this space, and is molded to the flange 140 and to the ring 142.

As shown in FIG. 6, a plurality of generally rectangular slots 146 are formed through the flange 140 to form a plurality of flex members 148.

As a result of the above, the flexure assembly 110 is cantilever supported, through the isolator assembly, to the bearing shaft 114. Radial acceleration causes a rocking type movement of the assembly about the necked-down portion 112b, which movement occurs about the approximate center of the isolator cylinder 134. The rocking angle is small, so the movement of the flexure assembly 110 to radial forces is essentially in a radial direction. The restraint and damping in this direction are primarily determined by stresses on the elastomer ring 144 in shear, since the restraint due to the elastomer cylinder 134 is relatively low, especially due to the presence of the necked-down portion 112b.

Axial acceleration causes the flexure assembly 110 to move axially with respect to the bearing shaft 114. The primary restraint and damping to this movement is determined by the elastomer cylinder 134 stressed in shear. The high restraint due to stressing the elastomer ring 144 in compression, is nullified because it is axially supported by flex members 148, which are very compliant in the axial direction.

The embodiment of FIGS. 5 and 6 requires minimum additional space because most of the system is fitted within the bearing drive shaft. The isolator load carrying capability is high because large area isolators are used in shear. The spacing between the isolator materials is relatively wide, which reduces the stress due to angular forces and reduces the angular motion due to radial forces.

Figure 7:
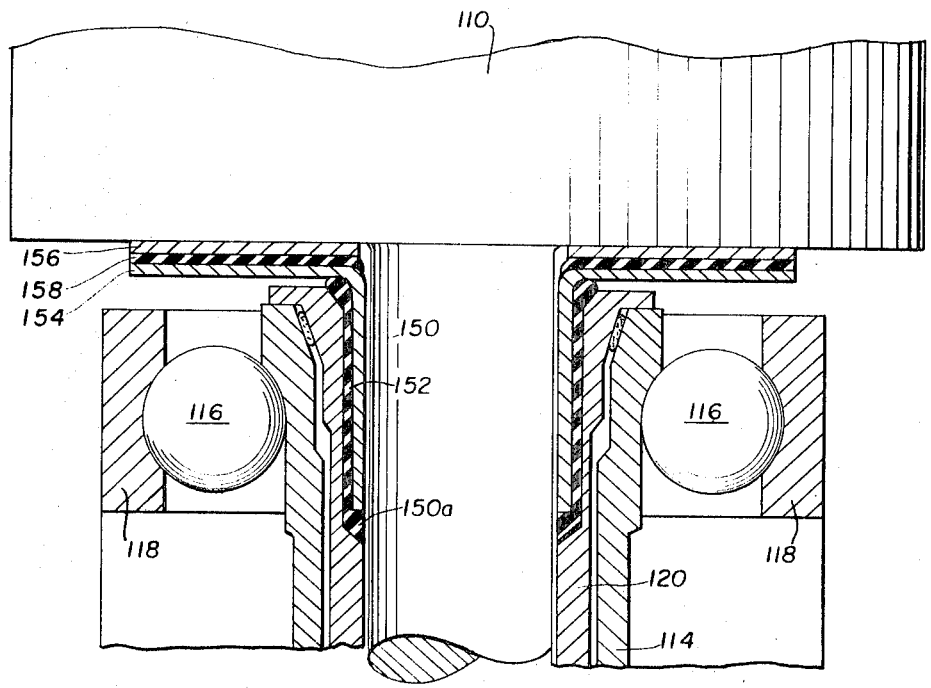
FIG. 7 is a view similar to FIG. 1, but depicting another embodiment of the present invention.

Since the embodiment of FIG. 7 is substantially identical to that of FIG. 5 in several respects, identical structure is given similar reference numerals and only a portion of FIG. 7 is shown.

According to this embodiment, the outer sleeve 120 has a counterbore provided in its upper end thereof which receives a sleeve 150. An elastomer cylinder 152 extends between the sleeve 120 and the sleeve 150, with a portion 150a of the elastomer material providing axial spacing between the sleeves.

A flange 154 is provided on the sleeve 150 and is spaced from a ring 156 adhered to the bottom portion of the flex assembly 110, with an elastomer ring 158 extending between the flange 154 and the ring 156.

The remaining structure of the embodiment of FIG. 7 is identical to that of the embodiment of FIGS. 5 and 6, especially including the presence of the cylindrical member of elastomer material extending between the outer sleeve 120 and an inner sleeve.

In operation of the system of FIG. 7, radial acceleration of the flex assembly 110 with respect to the shaft 114 causes a shear force to be applied to the elastomer ring 158, and a compressive or tensile force to the elastomer cylinder 152. The restraint of this motion is primarily determined by the elastomer ring 158, since the elastomer cylinder 152 is much stiffer in the radial direction. Restraint to motion of the flex assembly 110 with respect to the shaft 114 in the axial direction is determined by the sum of the restraint of the elastomer cylinder 152 and the elastomer cylinder 134 (as depicted in FIG. 5) in shear. The elastomer cylinders 152 and 134 are considerably more compliant in shear than the elastomer ring 158 which is alternately in compression and tension. Thus, the same advantages which apply to the embodiment of FIG. 5 also apply to the embodiment of FIG. 7.

Figure 8:
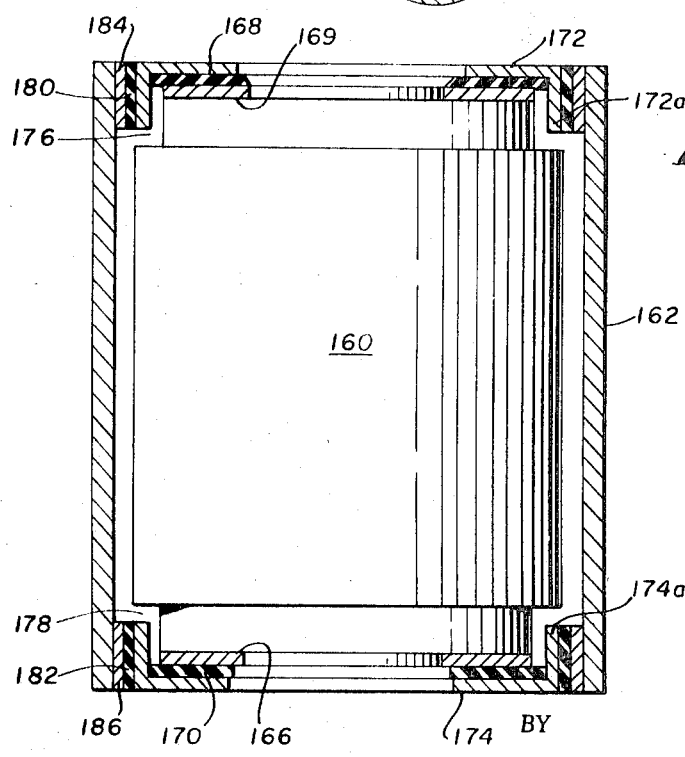
FIG. 8 is a vertical cross-sectional view of another embodiment of the present invention.

In the embodiment of FIG. 8, the isolator and damping system is adapted for use between a symmetrical load, which may be in the form of a motor housing 160, for example, and a symmetrical support in the form of a cylinder 162 fixed with respect to a platform or the like (not shown) in a known manner.

A pair of rigid rings 164 and 166 are affixed within notches formed at the respective ends of the housing 160, and each ring is cemented, or otherwise attached, to a pair of elastomer rings 168 and 170, respectively.

A pair of rigid cap members 172 and 174 are attached to the outer surfaces of the elastomer rings 168 and 170, respectively and have circular flanges 172a and 174a respectively formed thereon. These flanges extend in an axial direction, as viewed in FIG. 8, within a pair of circular notches 176 and 178, respectively, formed in the housing 160.

A pair of elastomer cylinders 180 and 182 are attached to the outer surfaces of the flanges 172a and 174a, respectively, and extend in an axial direction. A pair of rigid cylinders 184 and 186 are attached between the outer surfaces of the cylinders 180 and 182, respectively, and the inner surface of the cylinder 162.

Radial restraint and damping of the relative movement between the housing 160 and the cylinder 162 are achieved by the elastomer rings 168 and 170 in shear, since the elastomer cylinders 180 and 182 are alternately in tension and compression.

Axial restraint and damping of relative movement between the housing 160 and the cylinder 162 are achieved by the elastomer cylinders 180 and 182 in shear, since the elastomer rings 168 and 170 are alternately in tension and compression.

It is understood that several variations in the above embodiments can be made without departing from the scope of the invention. For example, in the embodiment of FIGS. 1-4, the outer sleeve 20 can be machined integral with the drive shaft 14 and the inner sleeve 30 can be machined integral with the flex hinge shaft 12. Also, in the embodiment of FIGS. 5 and 6, the necked-down portion 112b of the flex shaft 112 may be eliminated in configurations where the length of the elastomer cylinder 134 required for axial support is reduced to a point whereby its stiffness to a rocking motion is not excessive.

Of course, other variations of the specific construction and arrangement of the system disclosed above can be made by those skilled in the art without departing from the invention as defined in the appended claims.

We claim:

1. A system for connecting between two shaft members to provide isolation and damping of relative movement between the members, said system comprising inner and outer telescoped coupling sleeves respectively secured to said members, said inner and outer sleeves forming an annular space therebetween, said outer sleeve having an axis of rotation, damping means, axial spring means disposed radially inwardly of said outer sleeve and arranged to provide a relatively large spring resistance to relative axial movements between said sleeves, and a relatively small spring resistance to relative radial movements between said sleeves and radial spring means disposed radially outwardly of said outer sleeve and arranged to provide a relatively large spring resistance to relative radial movements between said sleeves and a relatively small spring resistance to relative axial movements between said sleeves.

2. The system of claim 1 wherein said damping means includes a fluid disposed in said annular space, and wherein said radial spring means comprises a first radial flange and a second radial flange and a plurality of peripherally spaced spring portions disposed radially outwardly of said outer sleeve, said first radial flange being fixedly connected to said inner sleeve, said second radial flange being axially spaced from and disposed adjacent said first radial flange and being fixedly connected to said outer sleeve, each said spring portion having first and second spaced portions respectively connected to said first and second radial flanges.

3. The system of claim 2 wherein said axial spring means includes a plurality of peripherally spaced spring portions, each spring portion having first and second spaced portions, said first spaced portion being fixedly connected to said inner sleeve, said second spaced portion being fixedly connected to said outer sleeve, said plurality of spring portions having a relatively large resistance to reciprocating axial force and a relatively small resistance to reciprocating shear force, and wherein said damping means includes a chamber for said fluid formed in one of said sleeves and communicating with said space to dampen relative axial movements between said shafts.

4. The system of claim 3 further comprising bellows means disposed in said chamber and adapted to compress in response to relative axial movements in one direction and expand in response to relative axial movements in the other direction to control the fluid flow to and from said chamber.

5. The system of claim 3 wherein said radial spring means includes an elastomer ring forming its plurality of peripherally spaced spring portions, and wherein said axial spring means includes an elastomer cylinder forming its plurality of peripherally spaced spring portions.

6. The mechanism of claim 5 wherein said flanges are connected together at two diametrically opposite areas, and wherein each of said flanges have arcuate notches formed therein.

7. The system of claim 5 wherein one end portion of said inner sleeve is fixed with respect to said outer sleeve and said flange extends from the other end portion of said inner sleeve, said relative radial movements resulting in a rocking movement of said inner sleeve with respect to said outer sleeve.

8. The system of claim 1 wherein said damping means is in the form of an elastomer molded to the outer wall of said inner sleeve and to the inner wall of said outer sleeve.

9. The system of claim 1 wherein said radial spring means for providing a spring resistance to relative radial movements comprises a flange extending outwardly from one of said sleeves, a ring fixed with respect to the other of said sleeves, and an elastomer molded between said ring and said flange.

10. The system of claim 1 wherein said sleeves are secured together and wherein one of said sleeves has a notched portion for providing said spring resistance to relative axial movements between said sleeves.

11. A system for connecting between a drive shaft member and a rotor driven shaft member of a free rotor gyroscope to provide isolation and damping of relative movement between the members, said system comprising a support housing having a first bearing surface, said drive shaft member having a second bearing surface and having a shaft axis, a pair of axially spaced bearing units disposed between said first and second bearing surfaces, and radially spaced inner and outer telescoped coupling sleeves respectively secured to said members, said inner and outer sleeves forming an annular space therebetween, damping means, axial spring means disposed radially inwardly of said outer sleeve and arranged to provide a relatively large spring resistance to relative axial movements between said sleeves, and a relatively small spring resistance to relative radial movements between said sleeves and radial spring means disposed radially outwardly of said outer sleeve and arranged to provide a relatively large spring resistance to relative radial movements between said sleeves and a relatively small spring resistance to relative axial movements between said sleeves.

12. The system of claim 11 wherein said damping means includes a fluid disposed in said annular space, and wherein said radial spring means comprises a first radial flange and a second radial flange and a plurality of peripherally spaced spring portions disposed radially outwardly of said outer sleeve, said first radial flange being fixedly connected to said inner sleeve, said second radial flange being axially spaced from and disposed adjacent said first radial flange and being fixedly connected to said outer sleeve, each said spring portion having first and second spaced portions respectively connected to said first and second radial flanges.

13. The system of claim 12 wherein said axial spring means includes a plurality of peripherally spaced spring portions, each spring portion having first and second spaced portions, said first spaced portion being fixedly connected to said inner sleeve, said second spaced portion being fixedly connected to said outer sleeve, said plurality of spring portions having a relatively large resistance to reciprocating axial force and a relatively small resistance to reciprocating shear force, and wherein said damping means includes a chamber for said fluid formed in one of said sleeves and communicating with said space to dampen relative axial movements between said shafts.

14. The system of claim 13 further comprising bellows means disposed in said chamber and adapted to compress in response to relative axial movements in one direction and expand in response to relative axial movements in the other direction to control the fluid flow to and from said chamber.

15. The system of claim 12 wherein said damping means includes a chamber and orifice means disposed between said space and said chamber, the outer sleeve having a closed end and one end of the inner sleeve terminating a distance from said closed end to define said chamber, said damping fluid extending in the space and in said chamber to dampen relative axial and radial movements between said sleeves.

16. The system of claim 15 further comprising bellows means disposed in said chamber and adapted to compress in response to said relative axial movements in one direction and expand in response to said relative axial movements in the other direction to control the fluid flow to and from said chamber.

17. The system of claim 11 wherein said damping means includes an elastomer material extending in said space and secured with respect to said sleeves, a rigid ring disposed in a spaced relation to at least one end of one of said members, and an elastomer material secured between said ring and said end.

* * * * *